No. 677,304. Patented June 25, 1901.
J. N. YOUNG.
HARVESTER.
(Application filed Nov. 1, 1900.)
(No Model.) 2 Sheets—Sheet 1.

Witnesses Inventor
James N. Young
By H. B. Willson & Co.
Attorneys

No. 677,304. Patented June 25, 1901.
J. N. YOUNG.
HARVESTER.
(Application filed Nov. 1, 1900.)

(No Model.) 2 Sheets—Sheet 2.

Witnesses
F. L. Ousand
OT Cool.

Inventor
James N. Young.
By H. B. Willson & Co.
Attorneys

THE NORRIS PETERS CO., PHOTO-LITHO., WASHINGTON, D. C.

UNITED STATES PATENT OFFICE.

JAMES N. YOUNG, OF ALBION, MICHIGAN.

HARVESTER.

SPECIFICATION forming part of Letters Patent No. 677,304, dated June 25, 1901.

Application filed November 1, 1900. Serial No. 35,162. (No model.)

*To all whom it may concern:*

Be it known that I, JAMES N. YOUNG, a citizen of the United States, residing at Albion, in the county of Calhoun and State of Michigan, have invented certain new and useful Improvements in Harvesters; and I do declare the following to be a full, clear, and exact description of the invention, such as will enable others skilled in the art to which it appertains to make and use the same.

This invention has relation to improvements in corn-harvesters, and particularly to the cutting mechanism thereof.

One object of the invention is to provide cutting mechanism of the circular-saw type which will operate speedily and effectively, to mount the saw so as to be easily and quickly applied and removed, and to make provision for the continuous operation of the saw in turning corners and at such other times as it is desired to have the saw act during the temporary stoppage of the drive-gearing.

A further object of the invention is to provide a novel construction and arrangement of guards for the saw to conduct the stalks thereto and obviate liability of crowding.

With these and other minor objects in view the invention consists in certain novel features of construction, combination, and arrangements of parts, which will be hereinafter more fully described, and particularly pointed out in the appended claims.

Figure 1:
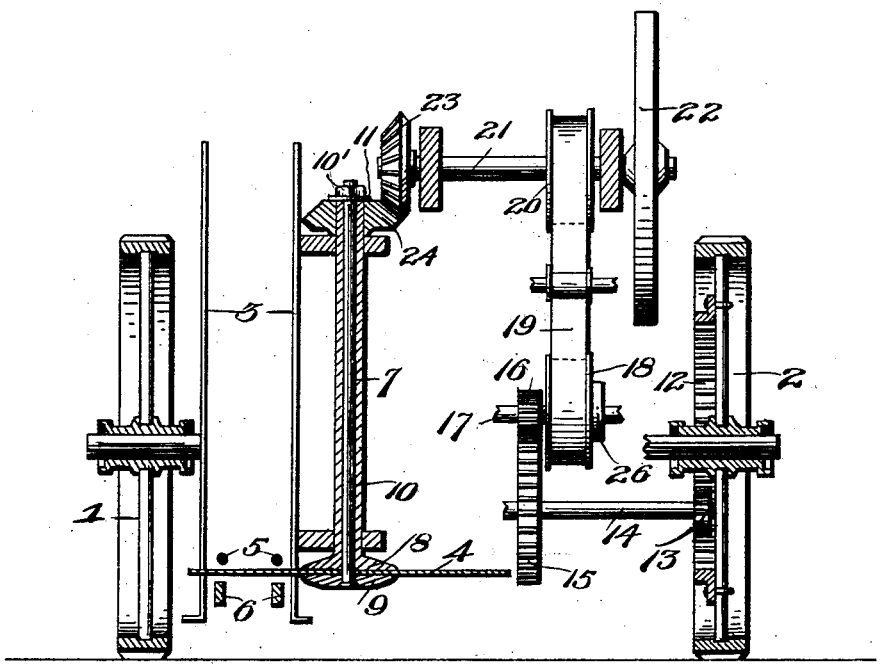
Figure 2:
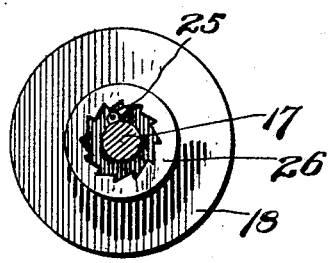
Figure 3:
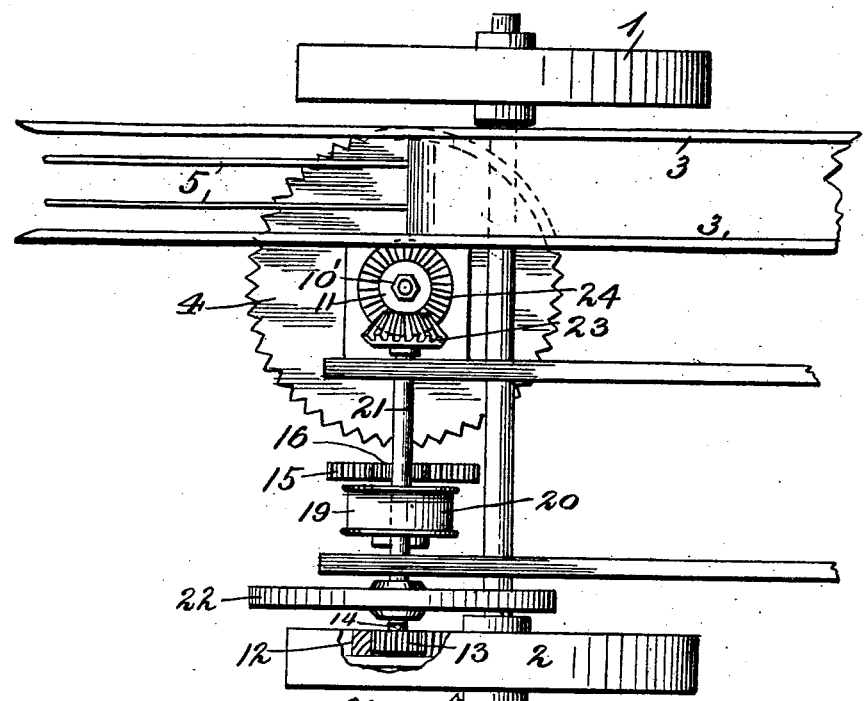
Figure 4:
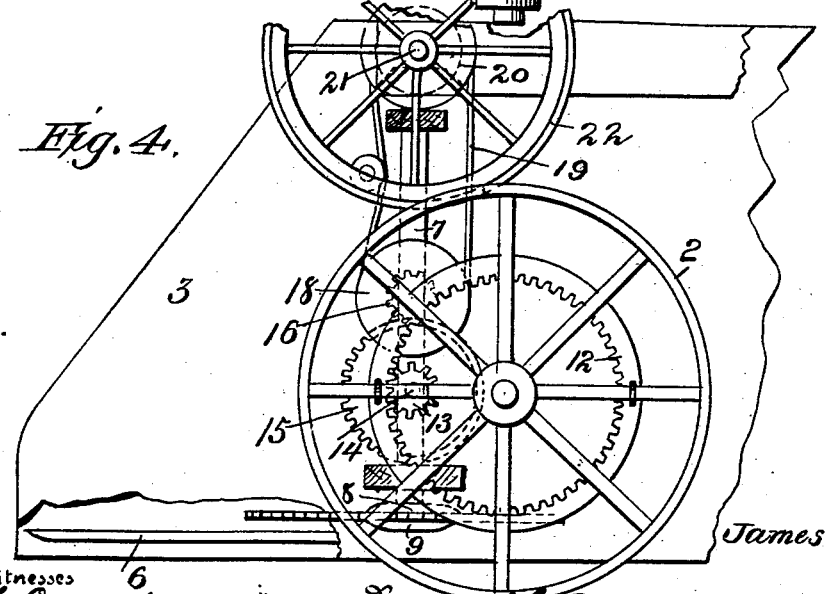

In the accompanying drawings, Figure 1 is a vertical transverse section showing so much of the frame and drive mechanism of a corn-harvester as is necessary to illustrate the application of the invention. Fig. 2 is a detail view of the clutch device. Fig. 3 is a top plan view, and Fig. 4 is a side elevation.

The numeral 1 in the drawings represents the ground-wheel at one side of the harvester, and 2 the master-wheel at the opposite side thereof, upon which the frame of the harvester is in practice supported, and 3 represents the side bars of the gatherer-supporting portion of the frame, between which the stalks of corn or cane are guided to the cutter.

4 represents a horizontally-arranged circular-saw which rotates in the path of the stalks across the space between said side bars, and 5 and 6 represent upper and lower pairs of spaced parallel guard rods and bars arranged, respectively, above and below the saw to guide the stalks thereto and prevent stones, sticks, and other obstructions from coming in contact with the saw. The saw is mounted upon the lower end of a vertical hollow shaft 7 and is clamped between heads 8 and 9, carried, respectively, by said shaft and by a bolt 10 passing therethrough, said bolt being provided at its upper end with a nut 10' and washer 11, bearing upon the upper end of the shaft, by which it is supported and adjusted to clamp the saw firmly between said heads. By detaching the nut the bolt may be slipped down through the hollow shaft and saw to release the latter, whereby the saw may be quickly and conveniently removed for sharpening and as readily replaced.

The hollow shaft and saw are operated through the medium of the following-described gearing: The master-wheel 2 is provided with an internal gear 12, with which meshes a pinion 13 upon one end of a horizontal drive-shaft 14, which also carries a gear 15. This gear 15 meshes with a pinion 16 upon one end of a counter-shaft 17, which carries a pulley 18. A belt 19 connects this pulley with a pulley 20 on a horizontal shaft 21, carrying at one end a fly-wheel 22 and at the opposite end a bevel-gear 23, which meshes with a bevel-pinion 24 on the upper end of the hollow shaft 7. By this construction it will be clear that as the harvester is drawn along a field motion will be communicated by said gearing to the hollow shaft and the saw rapidly rotated.

It is desirable that the energy stored up by the fly-wheel 22 may be utilized for driving the saw when the harvester is turning a curve and the driving mechanism proper is at rest or operating slowly or when the harvester is stopped for a short period of time in order to avoid racking of the gearing when the drive mechanism is again started. To adapt this to be done, I mount the pulley 18 loosely on the counter-shaft 17 and provide a clutch connection between these parts, said clutch connection comprising a pivoted spring-actuated pawl 25 on the end of the counter-shaft opposite the pinion 16 and an internal ratchet-rim 26 upon the contiguous side of the pulley. The teeth of the rim are so arranged that in the normal operation of the parts the pawl will engage said teeth and rigidly connect the pulley to the counter-shaft, whereby motion from the master-wheel is communicated to the fly-wheel shaft 21. When the motion of the drive-shaft 14 ceases or becomes less rapid than the fly-wheel shaft, however, the greater velocity of the latter will cause the pulley 18 to turn loosely on its shaft, the teeth of the ratchet riding freely over the face of the pawl. By this means the speed of the fly-wheel shaft is not arrested, and the momentum thereof acquired by the storing up of power in the fly-wheel is utilized to keep the saw in action, whereby strain upon and racking of the gearing upon the starting up of the drive mechanism at normal speed again will be reduced to the minimum, as will be readily understood.

From the foregoing description, taken in connection with the accompanying drawings, the construction and mode of operation of the invention will be readily understood, and it will be seen that a simple and desirable construction of cutting mechanism is provided.

Changes in the form, proportion, and minor details of construction may be made within the scope of the invention without departing from the spirit or sacrificing any of the advantages thereof.

Having thus fully described my invention, what I claim, and desire to secure by Letters Patent, is—

1. In a harvester, the combination with an internally-geared master-wheel, mounted on an axle, the operating-shafts of said harvester horizontally arranged one above the other, the lower one of which is the driving-shaft having a pinion thereon, mounted in the path of said internal gear, a gear-wheel on the same shaft, a pinion on the middle or counter shaft engaging therewith, said counter-shaft having a loose band-wheel thereon, the upper shaft having on one end a fly-wheel, its opposite end provided with a gear-wheel, a fixed band-wheel on said upper shaft, a band connected thereto, and to the loose band-wheel, of a hollow shaft with a rigid head, a bolt, an additional head, a saw interposed between said heads, the bolt passing through the heads, saw and shaft, a bevel-gear on the upper end of said shaft, means for clamping the saw between said heads and also securing the bevel-gear to the upper end of the shaft, and the said loose band-wheel having an internal ratchet-wheel, a spring-pawl on said middle or counter shaft whereby said loose band-wheel is adapted to be regulated, thereby regulating the saw at the turning-point of the row, substantially as specified.

2. In a harvester, the combination with a vertical hollow shaft having a rigid head at its lower extremity, a bolt, an additional head, a gear-wheel mounted on the upper end of the shaft, a saw interposed between said heads, the bolt passing through the shaft, heads, and saw and means connected to said bolt thereby clamping the saw between said heads and also securing said bevel-gear on the shaft, a vertical bevel-gear engaging said bevel-gear on said shaft, and means operating with said connecting bevel-gear whereby to rotate the shaft and bolt, thereby rotating the saw, substantially as specified.

3. In a harvester, the combination with a vertical hollow shaft having a rigid head at its lower extremity, a bolt, an additional head, a gear-wheel mounted on the upper end of the shaft, a saw interposed between said heads, the bolt passing through the shaft, heads, and saw and means connected to said bolt thereby clamping the saw between said heads, and also securing the bevel-gear on the shaft, a vertical bevel-gear engaging said bevel-gear on said shaft, and means operating with said bevel-gear whereby to rotate the shaft and bolt, thereby rotating the saw, of the side guides arranged in the path of the saw, and the guard rods and bars arranged respectively above and below the saw to guide the substance to be cut thereto, and said rods and guards preventing foreign substances from coming in contact with said saw, substantially as specified.

In testimony whereof I have hereunto set my hand in presence of two subscribing witnesses.

JAMES N. YOUNG.

Witnesses:
 HENRY HILLER,
 H. F. SHAW.